July 14, 1970  W. C. THOMAS  3,520,221
SPACER FOR ROTARY SLITTING KNIVES AND THE LIKE
Filed Sept. 11, 1967
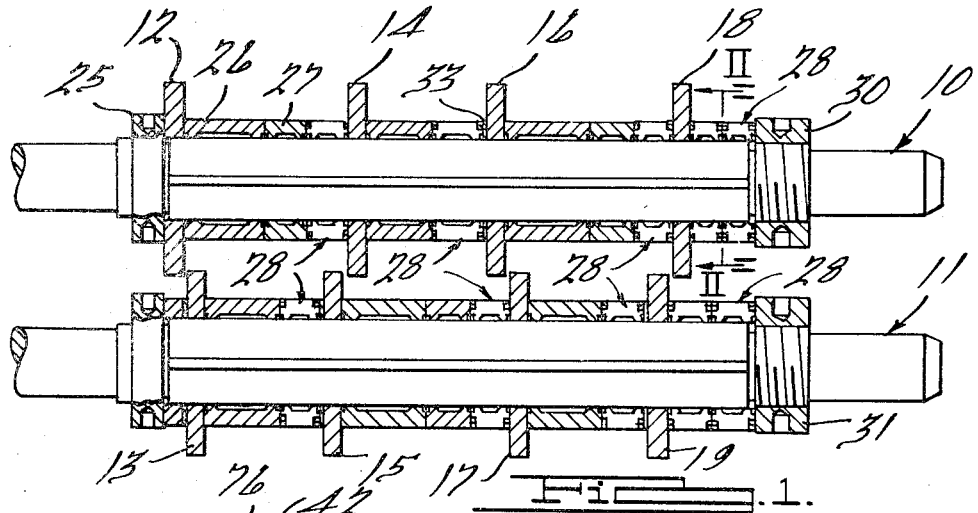
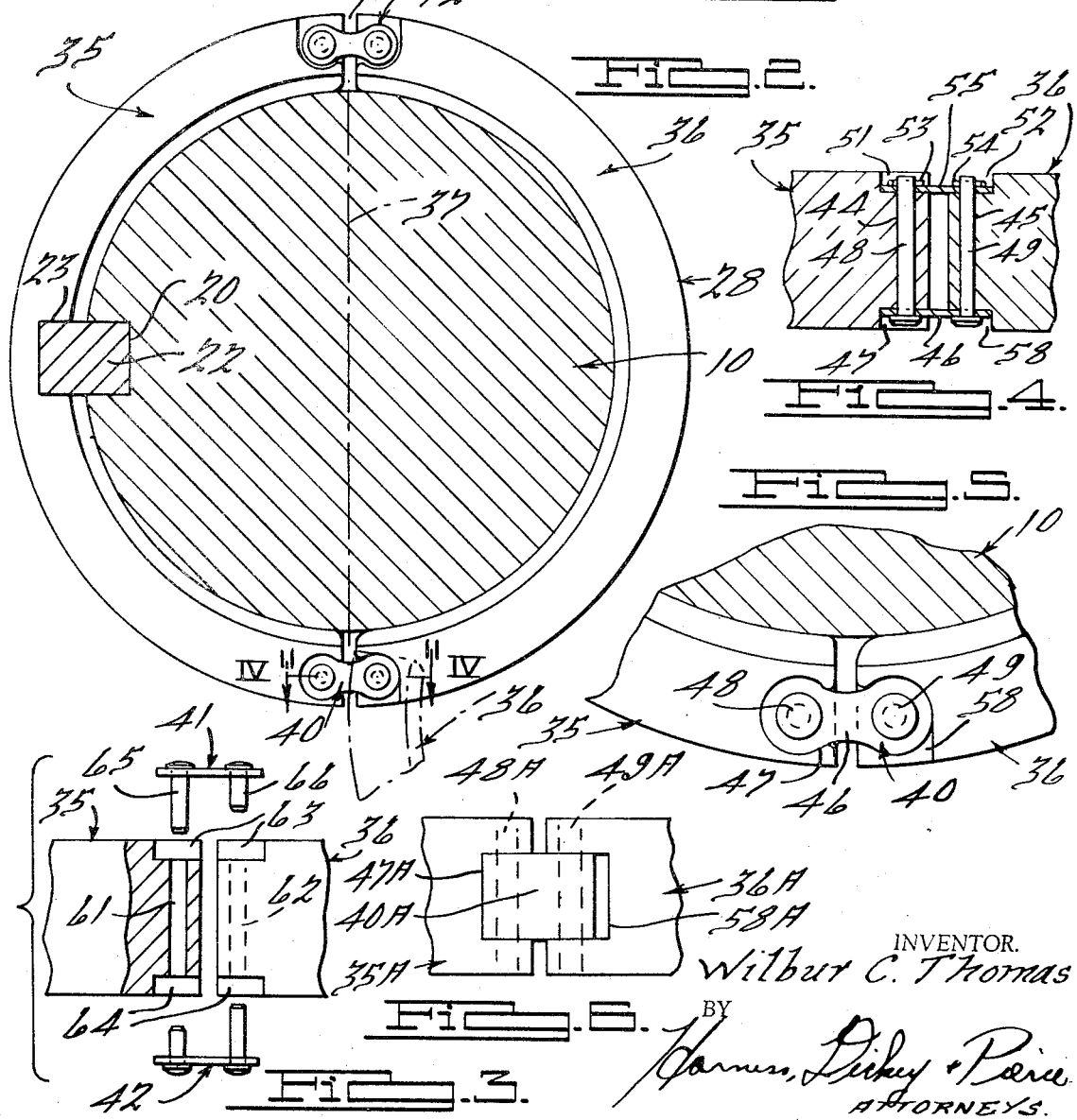
INVENTOR.
Wilbur C. Thomas
BY
Harness, Dickey & Pierce
ATTORNEYS.

United States Patent Office 3,520,221
Patented July 14, 1970

3,520,221
SPACER FOR ROTARY SLITTING KNIVES
AND THE LIKE
Wilbur C. Thomas, 8 Clinton Lane,
Dearborn, Mich. 48120
Filed Sept. 11, 1967, Ser. No. 666,901
Int. Cl. B26d 1/24
U.S. Cl. 83—664           1 Claim

ABSTRACT OF THE DISCLOSURE

A spacer for the disc knives of rotary slitting machines is formed in two complementary semi-cylindrical sections hinged together on a line parallel to the axis to form an openable ring for installation on and removal from the arbor from one side and without threading along the arbor, the hinging means comprising one or more arms connected to the sections by a double pintle assembly having two pintle axes, one in each section, the hinging means being rigid with respect to one of the sections so that all hinging movement occurs about one of the pintle axes and the sections cannot close in a nonconcentric relation.

When closed the sections are held together by U-type fasteners inserted from the side and which are retained by being blocked by adjacent knife or spacer elements after assembly.

---

The purpose of this abstract is to enable the Patent Office and the public generally and especially the scientist, engineer or practitioner in the art who is not familiar with patent or legal terms or phraseology to determine quickly from a cursory inspection the nature and essence of the technical disclosure of the application. The abstract is neither intended to define the invention of the application, which of course is measured by the claim, nor is it intended to be limiting as to the scope of the invention in any way.

BACKGROUND OF THE INVENTION

In the high speed slitting of sheet and strip stock such as sheet metal by means of slitters having rotary slitting knives, it is usually desired that the spacing of the slitter knives be adjustable so that strip stock of different widths can be produced as may be desired by the customer. In the past it has been customary to space all of the slitter knives along their supporting arbors by means of accurately ground solid steel spacer rings, supplemented usually by suitable shims which are ordinarily employed to adjust the clearance between the mating knives, since the required clearance varies with the work. The shims are also customarily either formed of accurately ground steel, or of hard plastic, the knives, spacer rings and shims being clamped together and accurately positioned against a shoulder at one end of the arbor by means of a nut on the other end. Where the spacing of the knives is to be changed to accommodate an order for stock of a different width from that produced theretofore, it has ordinarily been necessary to remove the arbor, the clamping nut, and all of the knives, spacers and shims from one end of each of the arbors, since the knives, spacers and shims are of uninterrupted annular form, and then to reinstall the knives, and the changed and/or shifted spacers and shims. This is a laborious and time consuming operation, particularly since the parts are large, heavy, and accurately fitted. The knives are in some instances several feet in diameter, and the arbors, spacers and other parts correspondingly large, and due to their high accuracy, they must be accurately positioned and aligned while being installed. Although attempts have been made heretofore to provide spacers for such heavy duty slitting installations which could be removed from the arbors laterally, these have been subject to shortcomings which have prevented their general acceptance.

The overall objective of the present invention is to provide improved sectional spacer means for heavy duty slitting knives of the disc type which can be installed and removed from the side of the arbor easily and without damage to the arbor. A further object is to provide improved sectional spacer means which is equipped with simple, safe and reliable fastening means, which fastening means is easy to operate despite the weight of the parts. Another object is to incorporate means insuring maintenance of a concentric and symmetrical relationship of the parts as they are opened and closed, thereby preventing interference between one or more of the sections and the arbor during closing.

Other objects and advantages will be apparent upon consideration of the present disclosure in its entirety.

IN THE DRAWING

FIG. 1 is a longitudinal sectional elevational view of the arbors of a rotary slitter provided with spacing means constructed in accordance with the present invention;

FIG. 2 is a cross section on a larger scale taken substantially on the line II—II of FIG. 1, and looking in the direction of the arrows;

FIG. 3 is a fragmentary top plan view with portions separated and in section;

FIG. 4 is a sectional view taken substantially on the line IV—IV of FIG. 2 and looking in the direction of the arrows;

FIG. 5 is an enlarged side elevational view of the hinging portion, and

FIG. 6 is a fragmentary plan view of the hinging portion of a modified construction.

Referring now to the drawing, reference characters 10 and 11 designate generally the upper and lower arbors of a rotary slitting machine, other components of which are not shown, being well known in the art and forming no part of the present invention. The arbor 10 is shown as carrying four disc type knives 12, 14, 16 and 18, and the arbor 11 supports four coacting knives 13, 15, 17 and 19. In the construction shown, each arbor is provided with a keyway 20 for a driving key 22 and the knives, spacers and other components have conforming keyways as 23, although this specific method of driving is of course subject to variation.

At the left ends, the knife supporting portions of the arbors are provided with abutment shoulders 25. The general method of installing and spacing the knives is known in the art and will not require detailed consideration. In the typical installation shown in FIG. 1, the knife 12 of the upper arbor is held against the shoulder 25, and the solid steel spacers 26, 27 of conventional construction, together with a hinged sectional spacer 28 of my improved construction, and a shim 33, maintain the next knife 14 of the series at a desired spaced relationship from the knives 12 and 15, these elements and the remaining spacers and knives of the arbor 10 being held tightly together and against the shoulder 25 by the nut 30 threadably secured on the other end of the arbor. The knives 13, 15, 17 and 19 of the lower arbor 11 are similarly retained by a nut 31 and spacedly positioned adjacent, and typically in a slightly laterally spaced and slightly overlapping relationship to, the corresponding knives of the upper arbor. The extent of such spacing and overlapping of the coacting upper and lower knives varies with the work, as is well known (and in fact with some work no actual overlap may be employed).

In order to enable changing the spacing of the knives without the necessity of removing the arbors, knives, spacers, etc., I employ several of the spacers 28 formed in hinged sections, and the construction of a preferred form of which is best shown in FIGS. 2–5. It is usually advantageous to use such sectional spacers in conjunction with conventional solid spacers as 26, 27, a few of the sectional spacers 28 being provided for each arbor, so that the locations of the sectional spacers can be changed, to shift the knives to different spacings, when work of different widths is to be produced. The solid spacers may be of the width widths, in most instances, and the sectional spacers may be of widths from ½" to 2" or 3", where width adjustments of this order are expected. Those units of the complement of sectional spacers which at any given time are not needed for knife spacing are preferably installed between the nut 30 and the nearest knife, as shown.

The construction of all of the sectional spacers may be alike except for variations in width, although certain modifications may become desirable with changes of width, as will be brought out hereinafter.

As shown in FIG. 2, the spacer 28 comprises two semi-cylindrical sections 35, 36, separable by swinging away from a diametric plane 37 and secured together and on the arbor during use by a double pintel hinge assembly generally designated 40 located at one end of sections and by a pair of removable U-type fasteners 41, 42 removably securable to the other ends of the sections. At its hinged end, the spacer section 35 is provided with an axially parallel drilled hole 44. A similar drilled hole 45 is provided near the hinged end of section 36. On both side surfaces the area surrounding the end of the hole 44 is reduced in thickness to provide recesses 47, 51 which are shaped to snugly embrace the sides of the link-like hinge arms 46, 55. Arm 46 forms the bight section of a U-shaped double pintle assembly. The pintles 48, 49 are attached to arm 46 by upsetting, pintle 48 extending through the hole 44 and pintle 49 extending through hole 45. The opposite ends of the pintles extend into recessed portions 51, 52 on the opposite sides of sections 35, 36 respectively, where they are held against removal as by cotter pins 53 and 54, and arm 55 corresponding to the arm 46 being fitted on the pintles under the cotter pins in recesses 51 and 52. The arms 46 and 55 are formed of hardened chain link elements. Both of the recesses 47 and 51, located on opposite sides of section 35, fit closely against both sides of such arms thereby preventing arms 46 and 55 from turning around the axis of pintle 48, and maintaining such arms in a positioning which supports the pintle 49 in a fixed relationship to section 35. The section 36, which is swingable on the pintle 49, is therefore closable to the operative position shown in full lines in FIG. 2 only in a manner which brings it into concentric relation to the section 35, without permitting any misalignment or displacement of section 36 with relation to section 35 along the diametric plane of separation. The recesses 52, 58 at the hinged end of section 36, however, are enlarged downwardly, as shown in FIG. 5, to permit section 36 to swing outwardly and downwardly to the dotted line position in which it may clear the arbor to permit its removal from or installation on the arbor together with the attached section 35.

When the sections are closed upon the arbor, as shown in full lines in FIG. 2, the fasteners 41 and 42 are installed. Fasteners 41 and 42 have short pins 65, 66 which have a slip-fit in the holes 61, 62 in sections 35, 36 respectively. The recesses 63, 64 at the ends of the holes 61, 62 are deep enough so that no portions of the fasteners 41, 42 project beyond the sides of the spacer sections 35, 36, and the components of the double pintle hinging assembly are also sufficiently recessed to present no such interference.

When suacers of my improved type are to be changed, the nut 30 is unscrewed from its threaded arbor portion and moved back sufficiently to permit the sectional spacers to be moved apart from adjacent parts far enough to enable the fasteners 41, 42 to be pulled out and removed. The section 36 is then swung open and the assembly pulled off the key 22 and from the arbor. A different sectional spacer of another thickness may or may not then be installed in the same location, depending upon the desired new knife position, but in any event the total length of the spacers and knives on the arbor will normally remain the same, the removed sectional spacer being placed under the nut if no longer needed, reinstallation of the spacer being effected by reversing the operations described above. When the U-fasteners, 41, 42 are installed they become trapped to lock the spacers in position as soon as the components are pushed together, so that accidental dislodgment of one of my improved sectional spacers is virtually impossible.

Where shimming or re-shimming is necessary to properly set the knife clearance, the shim at 33 is preferably of the radially split plastic type, which can be installed and removed from the side of the arbor. Thus, by removing, installing or substituting the desired sectional spacers the knives can be reset to changed positions without the necessity of removing the arbor or knives or changing the number of spacers.

The two sections 35 and 36 are actually somewhat less than semi-cylindrical in their angular extent, a suitable clearance as 76, which is not critical, being left at the diametral plane. No portion of either section is required to extend beyond such plane, and the ends of the sections are flat. This construction represents a great having in the relatively costly material required for these spacers, over the costs involved if either section were to have any portion exceeding 180°, and accurate finishing of the critical surfaces is easily performed.

In the modified construction shown in FIG. 6, hinging of sections 35A, 36A is effected by a single hinge block 40A installed non-pivotally in a cutout area 47A at the hinged end of section 35A by means of a pin 48A and projecting concentrically from such hinged end into a similar cut out area 58A of section 36A at the hinged end of the latter. The hinge block 40A is rounded top and bottom concentrically with the hinge pin 49A which secures it to section 36A and the opening 58A has sufficient clearance so that section 36A swings on pin 49A similarly to section 36 of the first embodiment, but cannot shift to disaligned, nonconcentric relation since the rear of block 40A is flat and snug against the flat bottom of cutout 47A.

Where the width (axial dimension) of the sectional spacer is sufficient, the embodiment of FIG. 6 becomes preferable from the standpoint of strength. It will also be seen that the hinge block 40A may be secured to section 35A by more than a single pin, and/or other modified securing means. Where the spacer is small in width, a single fastener inserted in one side only is used, rather than the two fasteners 41 and 42.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A multi-sectioned annular spacer for disc-type cutters and the like comprising two partly cylindrical complemental arcuate sections of like radius, each section being slightly less than 180° in extent, and a hinge assembly joining said sections at abutting peripheral ends of the sections, said hinge assembly comprising a hinging arm recessed both axially and peripherally at an end of and projecting circumferentially from one of said sections but restrained against radial movement with relation to said one section, a pintle pivotally jointing said arm to the other of said sections to permit hinging movement of said sections with relation to each other about a hinge axis in said other section and parallel to the axis of the annulus, and a pin-type fastener engageable in both of said sections at the abutting peripheral ends thereof remote fro mthe previously mentioned abutting ends and recessed in the axial ends thereof and engageable and disengageable with respect to at least one of said sections by movement in an axially parallel direction to selectively hold them in or release them from concentric relation.

References Cited
UNITED STATES PATENTS

| | | | |
|---|---|---|---|
| 1,075,760 | 10/1913 | Butler | 85—51 |
| 2,610,719 | 9/1952 | Hornbostel | 85—51 X |
| 2,851,917 | 9/1958 | Frew et al. | 85—51 |
| 3,314,700 | 4/1967 | Burrell | 85—51 X |

ANDREW R. JUHASZ, Primary Examiner

J. F. COAN, Assistant Examiner

UNITED STATES PATENT OFFICE
CERTIFICATE OF CORRECTION

Patent No. 3,520,221                                    July 4, 1970

Wilbur C. Thomas

It is certified that error appears in the above identified patent and that said Letters Patent are hereby corrected as shown below:

Column 3, line 10, "width" should read -- wider --; line 26, before "sections" insert -- the --; line 69, "52" should read -- 42 --; line 73, "suacers" should read -- spacers --. Column 4, line 27, "76" should read -- 70 --; line 30, "having" should read -- saving --; line 72. "jointing" should read -- joining --. Column 5, line 3, "fro mthe" should read -- from the --.

Signed and sealed this 16th day of February 1971.

(SEAL)
Attest:

Edward M. Fletcher, Jr.                                WILLIAM E. SCHUYLER, JR.
Attesting Officer                                             Commissioner of Patents